United States Patent
Tanaka et al.

(10) Patent No.: US 7,115,181 B2
(45) Date of Patent: Oct. 3, 2006

(54) METHOD OF MANUFACTURING FABRIC WITH RUBBER FOR TIRE

(75) Inventors: Gaku Tanaka, Kobe (JP); Kazuaki Yarimizu, Kobe (JP); Toru Fukumoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 192 days.

(21) Appl. No.: 10/650,927

(22) Filed: Aug. 29, 2003

(65) Prior Publication Data

US 2005/0072513 A1  Apr. 7, 2005

(30) Foreign Application Priority Data

Aug. 30, 2002  (JP) ............................. 2002-254776

(51) Int. Cl.
*B60C 9/00* (2006.01)
*D06H 7/14* (2006.01)

(52) U.S. Cl. .................. 156/259; 156/270; 225/97; 83/39; 83/425; 83/436.3; 83/857

(58) Field of Classification Search ............ None
See application file for complete search history.

(56) References Cited

U.S. PATENT DOCUMENTS 5,437,751 A * 8/1995 Hirano et al. ............... 156/134

FOREIGN PATENT DOCUMENTS

JP   5-208458 A  *  8/1993
JP   8-80707 A   *  3/1996

* cited by examiner

*Primary Examiner*—Sam Chuan Yao
(74) *Attorney, Agent, or Firm*—Birch, Stewart, Kolasch and Birch, LLP

(57) ABSTRACT

A method of manufacturing a rubber coated fabric for a tire which includes a weft cutting step of cutting a weft of the rubber coated fabric base substance using a cutting device at a cut pitch Cp of two to five times an arrangement pitch P of a warp. The cut ductility of the weft is set between 5 and 20%. The cutting device utilizes first and second rollers in which the peripheral protrusions and the peripheral grooves are alternately formed. Groove widths W1 and W2 of the peripheral grooves of the first and second rollers are set between 2.0 and 5.0 mm, protruding widths T1 and T2 of the peripheral protrusions of the first and second rollers are set to 0.25 to 0.5 times the groove widths W1 and W2, and the insertion depths h1 and h2 of the peripheral protrusions to the peripheral grooves are set between 2.0 and 4.0 mm.

9 Claims, 9 Drawing Sheets

METHOD OF MANUFACTURING FABRIC WITH RUBBER FOR TIRE

BACKGROUND OF THE INVENTION

1. Field of the Invention

The present invention relates to a method of manufacturing a rubber coated fabric for a tire, which can improve the uniformity of a tire.

2. Description of the Related Art

As shown in FIG. 8, a long fabric "d", in which a tire woven fabric "c", obtained by tire weaving a warp constituted by a tire cord "a", with a narrow weft "b" is coated by a rubber, is generally employed in a carcass ply of a pneumatic tire.

At the time of manufacturing the tire, the rubber coated fabric "d" is evenly cut into a plurality of cut pieces "d1" at a desired angle θ (of the order of 75 to 90° in a radial tire) with respect to the tire cord "a". Thereafter, a ply material "e" is formed by sequentially connecting each of the cut pieces "d1" at the end portions on the non-cut sides. The ply material "e" is then wound around a forming drum and is thereafter expanded in a troidal shape.

At the time of the expansion in the troidal shape, in order to improve the uniformity of the tire, it is necessary to expand in the peripheral direction while maintaining the interval between the tire cords "a" uniform. However, if the weft "b" still intertwines with the tire cord "a", the uniform expansion is prevented.

In recent years, as disclosed in Japanese Unexamined Patent Publication No. 5-208458, there has been proposed that the weft "b" is previously cut prior to the molding of the tire. In this structure, after the rubber coated fabric is irradiated with an electron beam, as shown in FIG. 9, the rubber coated fabric "d" is passed between a pair of rollers "r1" and "r2" in which peripheral protrusions "f" and peripheral grooves "g" continuously provided in a peripheral direction are alternately formed. Thus, a tensile force is applied to the weft "b" and the weft "b" is cut.

The rubber coated fabric is irradiated for the following reason. If the fabric "d", coated with rubber, is passed through without irradiating with the electron beam, there is the case where the weft "b" is displaced and thus a sufficient tensile force cannot be applied, due to a soft topping rubber. Therefore, a cut length is widely scattered such that a portion which is not partially cut is generated, and accordingly uniformity cannot be sufficiently improved. On the contrary, in the case where the coated fabric is irradiated, the modulus of the topping rubber is moderately increased by the electron beam, so that it is possible to inhibit the weft "b" from being displaced and thus it is possible to make uniform the cut length of the weft "b".

However, the structure in which the weft "b" is cut after irradiating with the electron beam tends to become deteriorated in its outer appearance such that a concave-convex trace generated at a time of passing through the rollers remains on the surface of the fabric "d", whereby a wavy undulation is generated on the side surface of the tire.

As a result, it has been found that a cut length of the weft can be made uniform without irradiating with the electron beam by controlling, in the roller, the width of the peripheral groove, the width of the peripheral protrusion, or the like, within a predetermined range.

SUMMARY OF THE INVENTION

The present invention provides a method of manufacturing a rubber coated fabric for a tire which can make uniform a cut length of a weft without irradiating with an electron beam, and can achieve a high degree of uniformity without adversely effecting the outer appearance normally caused by passing the rubber coated fabric through rollers.

In order to achieve the object mentioned above, in accordance with the present invention, there is provided a method of manufacturing a fabric for a tire in which a tire woven fabric, obtained by weaving a warp constituted by a tire cord and a weft is coated with a rubber, wherein the method comprises:

coating the tire woven fabric with a rubber so as to form a fabric base substance;

cutting the weft of the fabric base substance at a cut pitch $C_p$ twice to five times an arrangement pitch $P$ of the warp, wherein the weft employs a low ductility yarn having a cut ductility between 5 and 20%, the cutting device comprises a pair of rollers including a first roller in which a first peripheral protrusion continuously provided in a peripheral direction and a first peripheral groove are alternately formed in an axial direction, and a second roller in which a second peripheral protrusion inserted into the first peripheral groove and a second peripheral groove into which the first peripheral protrusion is inserted are alternately formed in an axial direction, the fabric base substance passes orthogonal to a roller axis within a gap formed between the first and second peripheral protrusions and the second and first peripheral grooves into which the first and second peripheral protrusions are respectively inserted, whereby the weft is cut, and groove widths $W_1$ and $W_2$ of the first and second peripheral grooves are set between 2.0 and 5.0 mm, protruding widths $T_1$ and $T_2$ of the first and second peripheral protrusions are set to 0.25 to 0.5 times the groove widths $W_1$ and $W_2$, and insertion depths $h_1$ and $h_2$ of the first and second peripheral protrusions to the first and second peripheral grooves are set between 2.0 and 4.0 mm.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENTS

Figure 1:
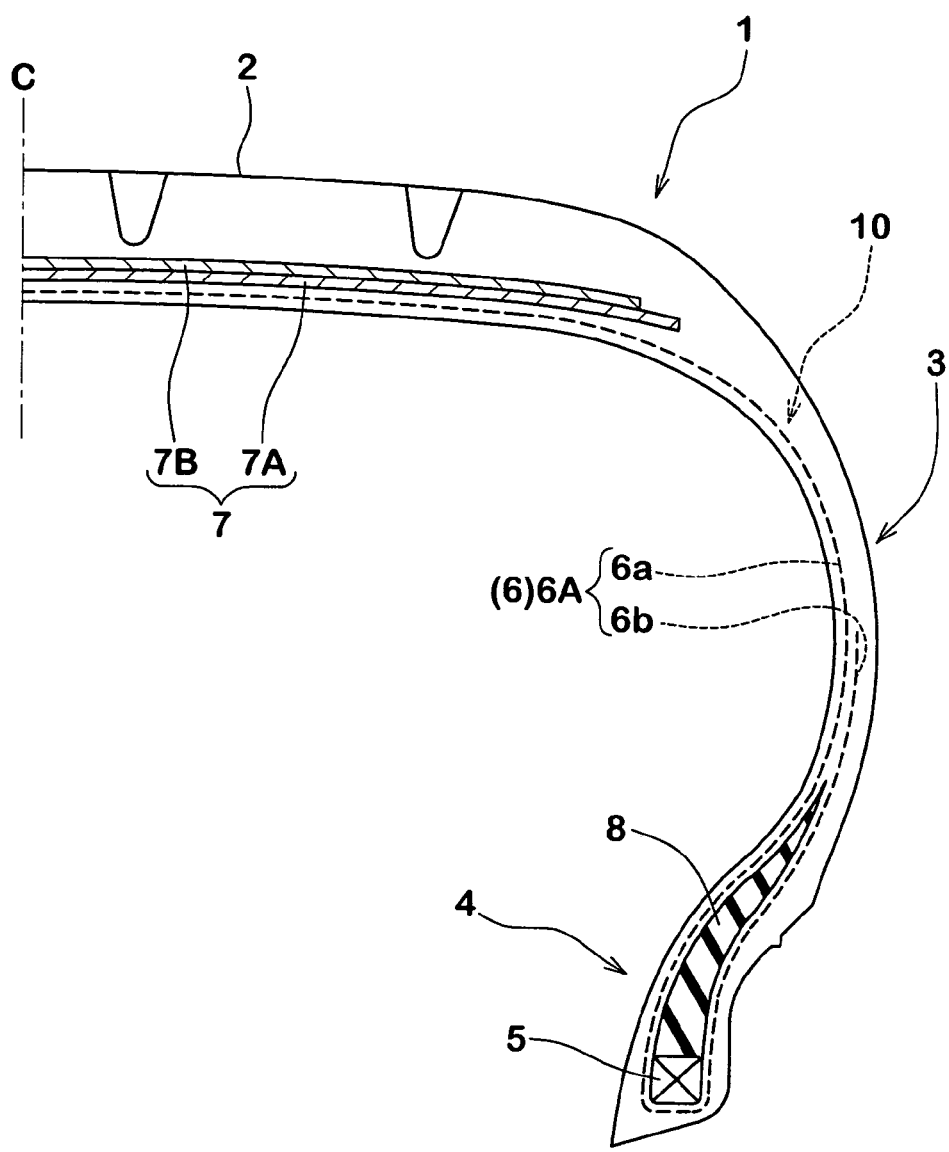
FIG. 1 is a cross sectional view showing one embodiment of a pneumatic tire in which a fabric with rubber manufactured by a manufacturing method in accordance with the present invention is used for a carcass ply.

The present invention will now be discussed with reference to the accompanying drawings. FIG. 1 is a cross sectional view showing a pneumatic tire 1 in which a fabric coated with rubber and manufactured by the method of the present invention is used as the carcass ply.

In FIG. 1, the pneumatic tire 1 comprises a carcass 6 extending from a tread portion 2 to a bead core 5 of a bead portion 4 via a side wall portion 3. A belt layer 7 is arranged on an inner side of the tread portion 2 and on the outer side of the carcass 6 in the radial direction.

The carcass 6 is constituted by one or more, one in the present embodiment, carcass plys 6A in which a carcass cord is arranged at an angle of between 75° and 90° with respect to a tire peripheral direction. As the carcass cord, their is employed an organic fiber cord such as a nylon, a polyester, a rayon or an aromatic polyamide. Further, the carcass ply 6A is provided with a series of ply fold-back portions 6b, each being folded back to the outer side from the inner side in the tire axial direction around the bead core 5, on both sides of the ply main body portion 6a extending between the bead cores 5 and 5. A rubber bead apex 8 for reinforcing the bead extends from the bead core 5 to the outer side in the tire radial direction in a tapered manner and is arranged between the ply main body portion 6a and the fold-back portion 6b.

The belt layer 7 is formed by two or more, two in the present embodiment, belt plies 7A and 7B, in each of which a belt cord is obliquely arranged at an angle of between 10° and 35° with respect to the tire peripheral direction. In the belt layer 7, the belt cords cross to each other between the plies thereby improving belt rigidity, and reinforcing the tread portion 2 with a hoop effect. A steel cord is preferably employed as the belt cord, although it is possible to also use an organic fiber cord having a high elasticity, for example, an aromatic polyamide fiber, an aromatic polyester fiber and the like. In this case, in order to improve high speed durability or the like, a well-known band ply (not shown) may be provided in a further outer side of the belt layer 7.

Figure 2:
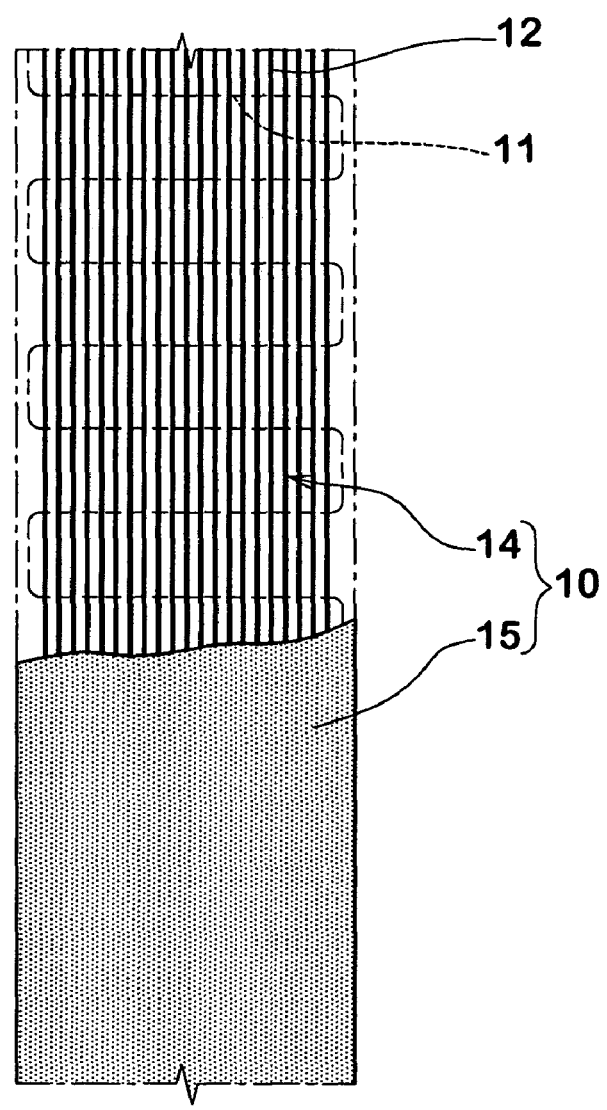
FIG. 2 is a plan view schematically showing the fabric coated with rubber.

Next, the carcass ply 6A is formed by a fabric 10 coated with rubber (schematically shown in FIG. 2) and manufactured in accordance with the method described below.

The fabric 10 coated with rubber is manufactured by coating a tire woven fabric 14 with a topping rubber 15 so as to form a fabric base substance 16, and cutting the weft 11 of the fabric base substance 16 at a cut pitch Cp which is twice to five times the pitch P of a warp 12 by using a cutting device 20.

The tire woven fabric 14 is formed by weaving the warp 12, constituted by a carcass cord corresponding to a tire cord 13, by the weft 11, using a well-known weaving machine. The present embodiment describes the structure in which the weft 11 is woven in accordance with a turn method, however, a tuck-in method may be employed. Further, the tire woven fabric 14 is exposed to a so-called dip treatment, for example, dipping the fabric in an adhesive liquid. Both surfaces of the tire woven fabric 14 are then coated by the topping rubber 15 by using a well-known topping apparatus such as a calendar roll or the like. Accordingly, the fabric base substance 16 is formed.

Further, in the formation of the tire, it is important to uniformly expand portions between the tire cords 13 so as to improve uniformity, as described above. Therefore, it is necessary to previously cut the weft 11.

In accordance with the present invention, the weft 11 is uniformly cut at a predetermined cut pitch Cp without irradiating with the electron beam, by using an easily cut, low ductility yarn in which the cut ductility is within a range between 5 and 20%, for the weft.

Figure 3:
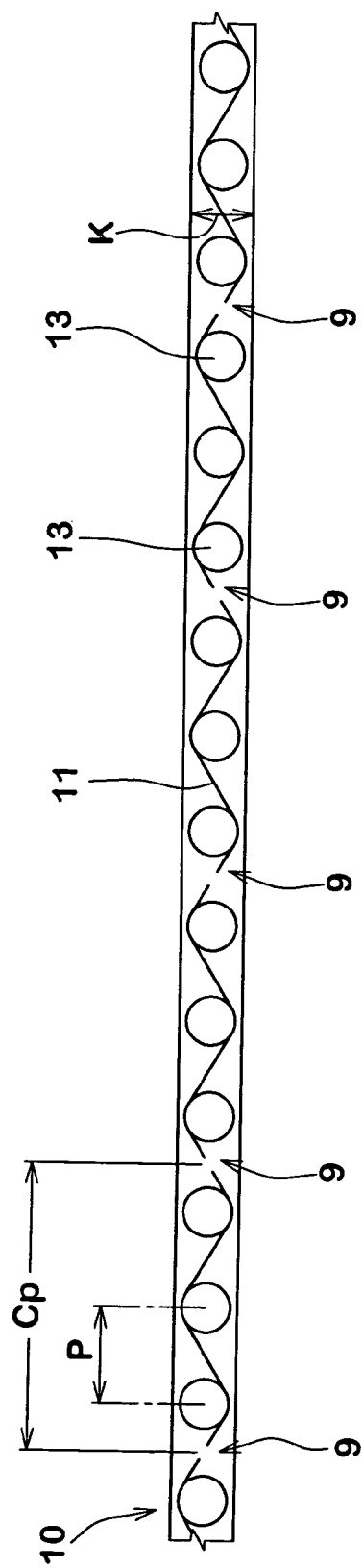
FIG. 3 is a cross sectional view showing a part of the rubber coated fabric in an enlarged manner.

As a result of the experimentation by the present inventor, it is necessary to uniformly cut the weft 11 at a cut pitch Cp of two times to five times the arrangement pitch P of the warp 12, as briefly illustrated in FIG. 3, in order to sufficiently improve uniformity. Accordingly, in the present invention, it is assumed that the cut pitch Cp is within the range of two times to five times the arrangement pitch P. In this case, reference numeral 9 in FIG. 3 denotes a cut portion of the weft 11.

Figure 4:
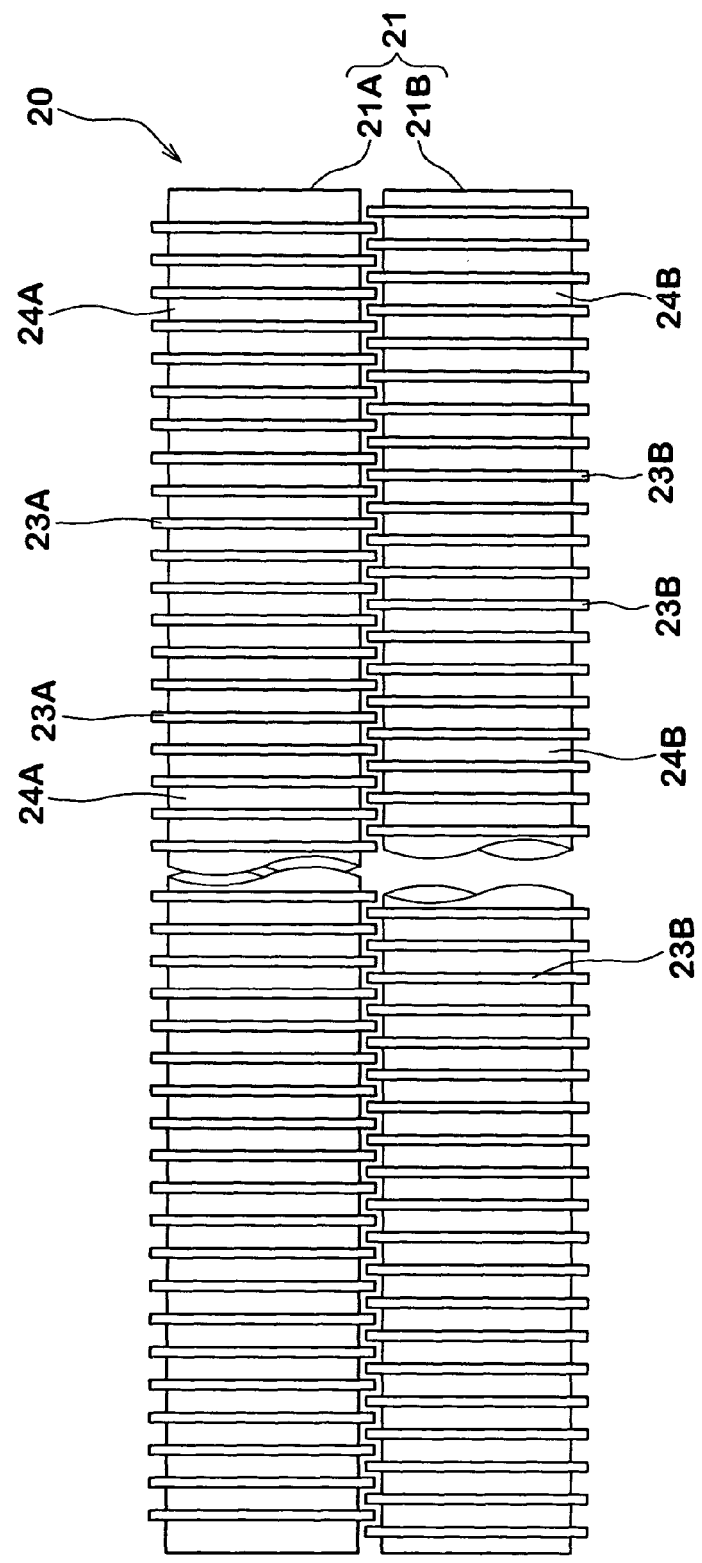
FIG. 4 is a front elevational view showing a pair of rollers.
Figure 5:
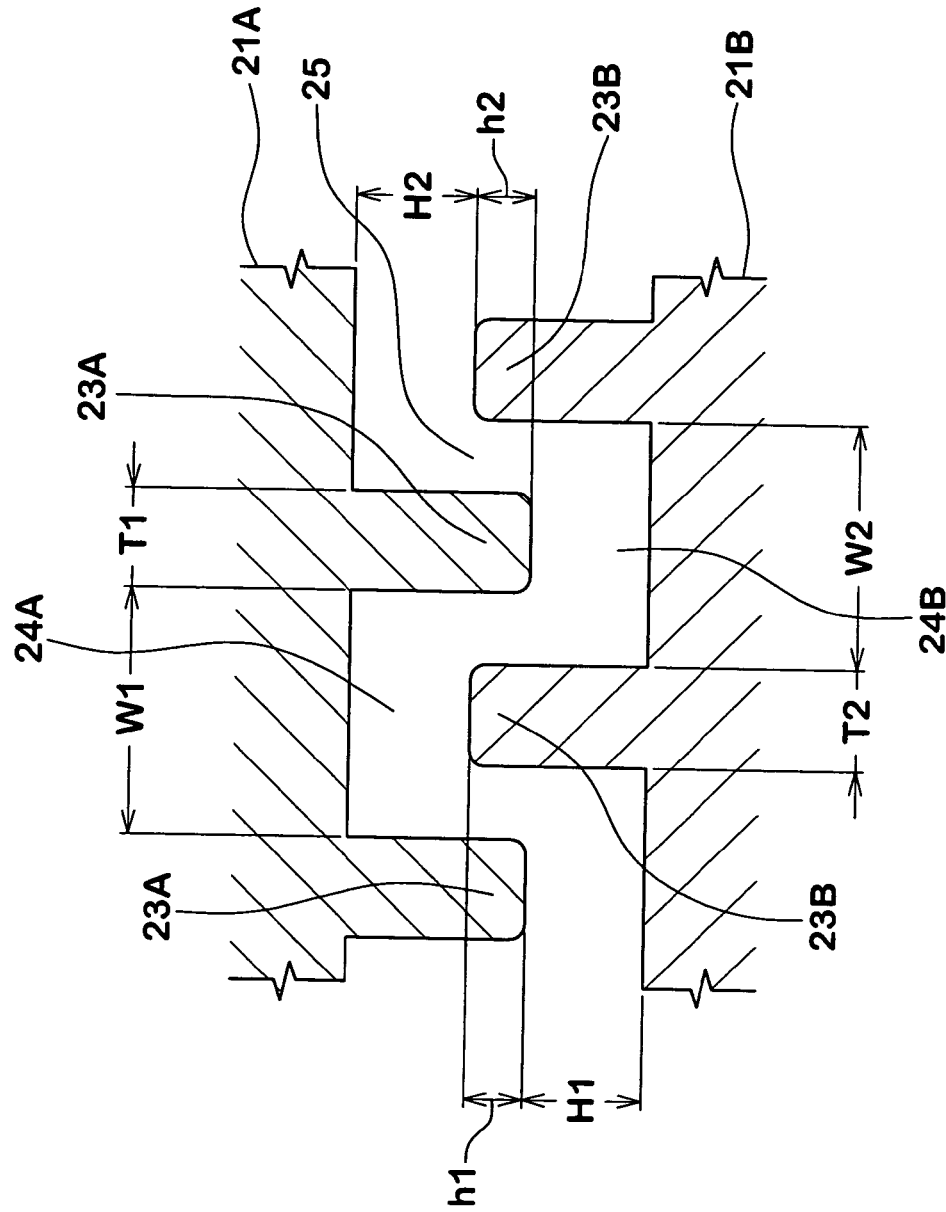
FIG. 5 is a cross sectional view showing peripheral grooves and peripheral protrusions in a pair of rollers in an enlarged manner.

Further, in the weft cutting step, as briefly illustrated in FIGS. 4 and 5, the weft 11 is cut by the application of a tensile force, by using a cutting device 20 including a pair of rollers 21 constituted by a first roller 21A and a second roller 21B, and passing the fabric base substrate 16 through a portion between the first and second rollers 21A and 21B in a direction orthogonal to a roller axis.

More specifically, in the first roller 21A, a rib-shaped first peripheral protrusion 23A continuously provided in the peripheral direction and a stripe-shaped first peripheral groove 24A are alternately formed in an axial direction, on an outer periphery of the first roller 21A.

Further, in the second roller 21B, a rib-shaped second peripheral protrusion 23B is inserted into the first peripheral groove 24A and a stripe-shaped second peripheral groove 24B receives the first peripheral protrusion 23A. The protrusions and grooves are alternately formed in an axial direction on the outer periphery of the second roller 21B. The first and second peripheral protrusions 23A and 23B are respectively inserted into the centers of opposing second and first peripheral grooves 24B and 24A, in the axial direction.

In the first and second rollers 21A and 21B, a gap 25 continuously extends in a zigzag or serpentine configuration in the axial direction by repeated convex and concave portions of the rollers. The fabric base substance 16 is conveyed between the first and second peripheral protrusions 23A and 23B and the second and first peripheral grooves 24B and 24A which are adapted to receive the first and second peripheral protrusions 23A and 23B. In this case, the first and second rollers 21A and 21B are pivoted in parallel to each other and rotatable by appropriate bearing means (not shown), and are rotated opposite to each other by an electric motor or the like.

Figure 6:
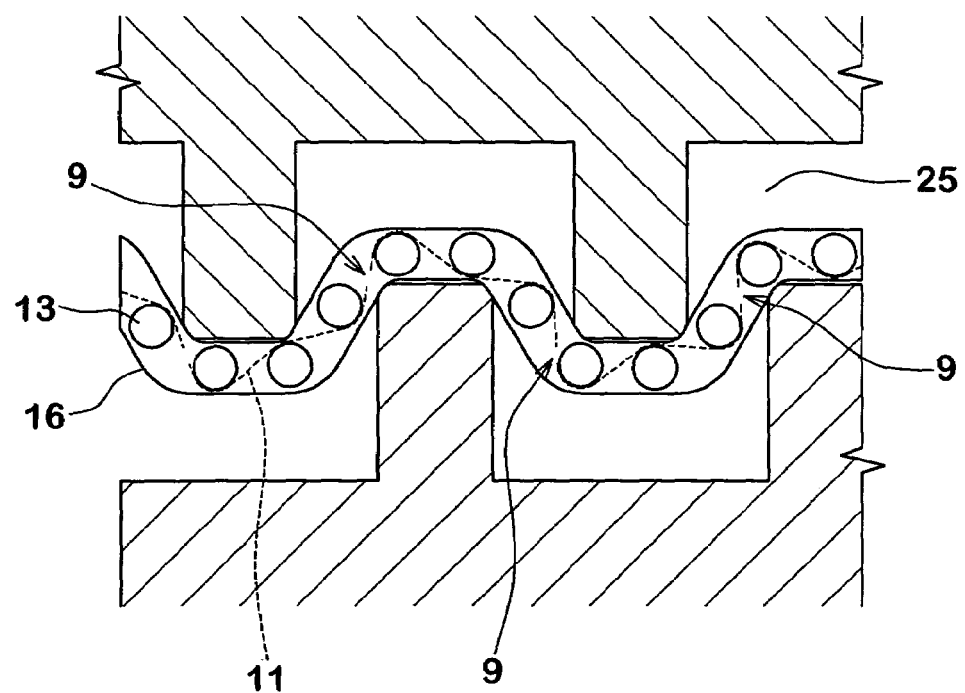
FIG. 6 is a cross sectional view describing a cutting operation of a weft by a pair of rollers.

Further, the fabric base substance 16 is enlarged in a wavy, serpentine shape whereby a tensile force is applied to the weft 11, as shown in FIG. 6, by passing the fabric base body 16 through the gap 25 in the direction where the weft 11 is in parallel to the axial direction, so that the weft 11 is cut.

At this time, in order to make uniform the cut pitch Cp, it is first necessary that the weft 11 is easily cut. Therefore, a low ductility yarn having a cut ductility of between 5 and 20% is used. The "cut ductility" corresponds to a maximum elongation (%) when the weft 11 is broken by the tensile load applied to the weft 11. In the case where the cut ductility is less than 5%, the weft is broken, for example, in the dip treatment, the rubber applying step or the like, and the warp 12 becomes disassembled, whereby the structure cannot be used for the carcass. On the contrary, in the case where the cut ductility exceeds 20%, the weft is hard to break, so that a uniform cut can not be achieved. Accordingly, it is preferable that the cut ductility is set between 7 and 15%, more preferably 9 and 13%. As to the weft 11, a yarn of 10 to 30 yarn number such as a cotton or a polynosic is preferable. Further, in view of the uniform cutting, it is preferable to set a breaking strength of the weft 11 to a range between 5 and 15 N, more preferably 7 and 13 N. In this case, the "breaking strength" means a tensile load when the weft 11 is broken by a tensile load applied to the weft 11, step by step.

Further, in order to make uniform the cut pitch Cp, as shown in FIG. 5, it is important to establish the following parameters:

setting the groove widths W1 and W2 of the first and second peripheral grooves 24A and 24B to a range between 2.0 and 5.0 mm;

setting the protruding widths T1 and T2 of the first and second peripheral protrusions 23A and 23B to 0.25 to 0.5 times the groove widths W1 and W2 of the second and first peripheral grooves 24B and 24A into which the first and second peripheral protrusions 23A and 23B are respectively inserted. Thus, the relationship $0.25W2 \leq T1 \leq 0.5W2$ and $0.25W1 \leq T2 \leq 0.5W1$ is established; and setting the insertion depths h1 and h2 of the first and second peripheral protrusions 23A and 23B into the second and first peripheral grooves 24B and 24A to a range of between 2.0 and 4.0 mm.

In this case, generally the groove widths W1 and W2, the protruding widths T1 and T2, and the insertion depths h1 and h2 are set to be equal to each other, as in the present embodiment, that is, the relationship W1=W2, T1=T2 and h1=h2 is set. However, at least one of the relationships may be different, as occasion demands, such that W1≠W2, T1≠T2 or h1≠h2.

In this case, when the groove widths W1 and W2 are less than 2.0 mm, and the protruding widths T1 and T2 are less than 0.25 times the groove widths W1 and W2, it is impossible to secure the strength required for the first and second peripheral protrusions 23A and 23B.

In the case where the groove widths W1 and W2 are larger than 5.0 mm, it is difficult to restrict the cut pitch Cp to be equal to or less than five times the arrangement pitch P of the tire cord, so that even in the case where the cut pitch Cp is uniform, it is impossible to obtain a sufficient effect of improving the uniformity.

Further, in the case that the protruding widths T1 and T2 is larger than 0.50 times the groove widths W1 and W2, and the insertion depths h1 and h2 are less than 2.0 mm, the tensile force applied to the weft 11 is such that non-uniformity of the cut pitch Cp is caused.

Further, in the case that the insertion depths h1 and h2 are larger than 4.0 mm, the elongation to the fabric base substance 16 becomes too much, so that the arrangement pitch P itself of the tire cord becomes irregular. Further, the concave-convex trace on the surface of the fabric base substance 16 generated at a time of passing through the rollers remains in the fabric, and the outer appearance of the fabric tends to deteriorate into wavy undulations generated at the side surface of the tire, and the like. In this case, since the fabric base substance 16 is not exposed to electron beam irradiation, the topping rubber holds a sufficient visco-elasticity. Accordingly, in the case when the insertion depths h1 and h2 are equal to or less than 4.0 mm, the concave-convex trace generated in the fabric base at the time of passing through the rollers, the irregularity of the tire cord arrangement pitch P and the like can recover, due to the visco-elasticity of the topping rubber.

In order to reduce the concave-convex trace in the fabric base at the time of passing through the rollers, it is preferable to form each of the corners of the peripheral protrusions 23A and 23B by a circular arc surface having a radius of between 0.2 and 1.0 mm.

In the present embodiment, the cutting device 20 can freely adjust the axial distance between the first and second rollers 21A and 21B by the bearing means, whereby the insertion depths h1 and h2 can be adjusted within the range mentioned above. In this case, it is preferable to set a radial distance H1 from the outer surface of the first peripheral protrusion 23A to the groove bottom of the second peripheral groove 24B and the radial distance H2 from the outer surface of the second peripheral protrusion 23B to the groove bottom of the first peripheral groove 24A to about 1.5 to 3.5 times the thickness K of the fabric base substance 16.

Figure 7A:
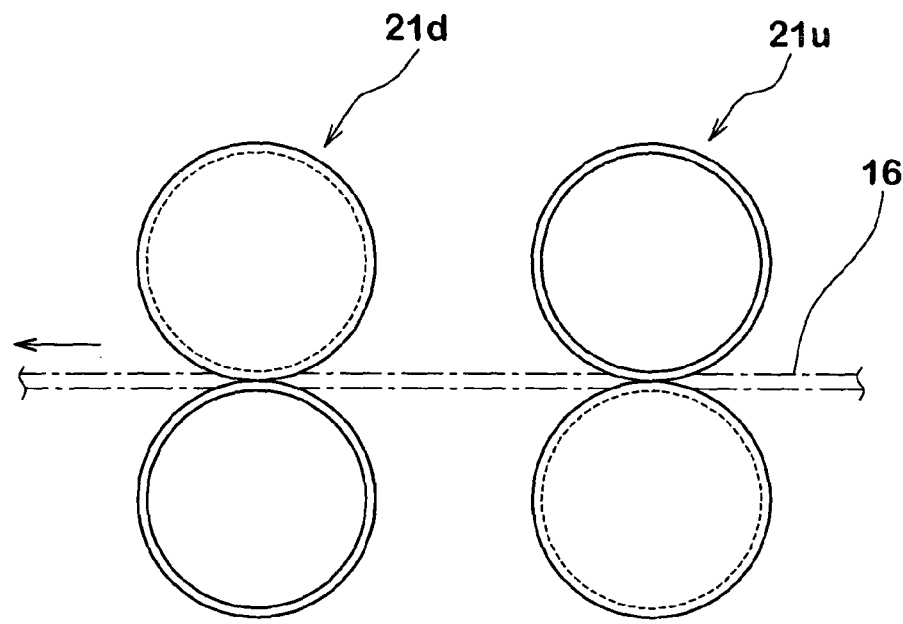
FIGS. 7A and 7B are a side cross sectional view and a plan view each showing another embodiment of the cutting device.
Figure 7B:
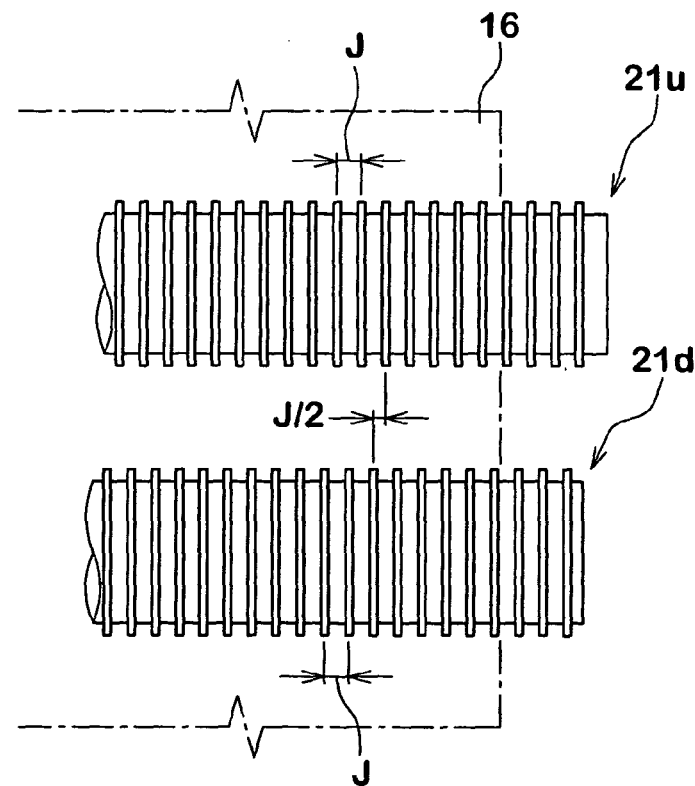
Figure 8:
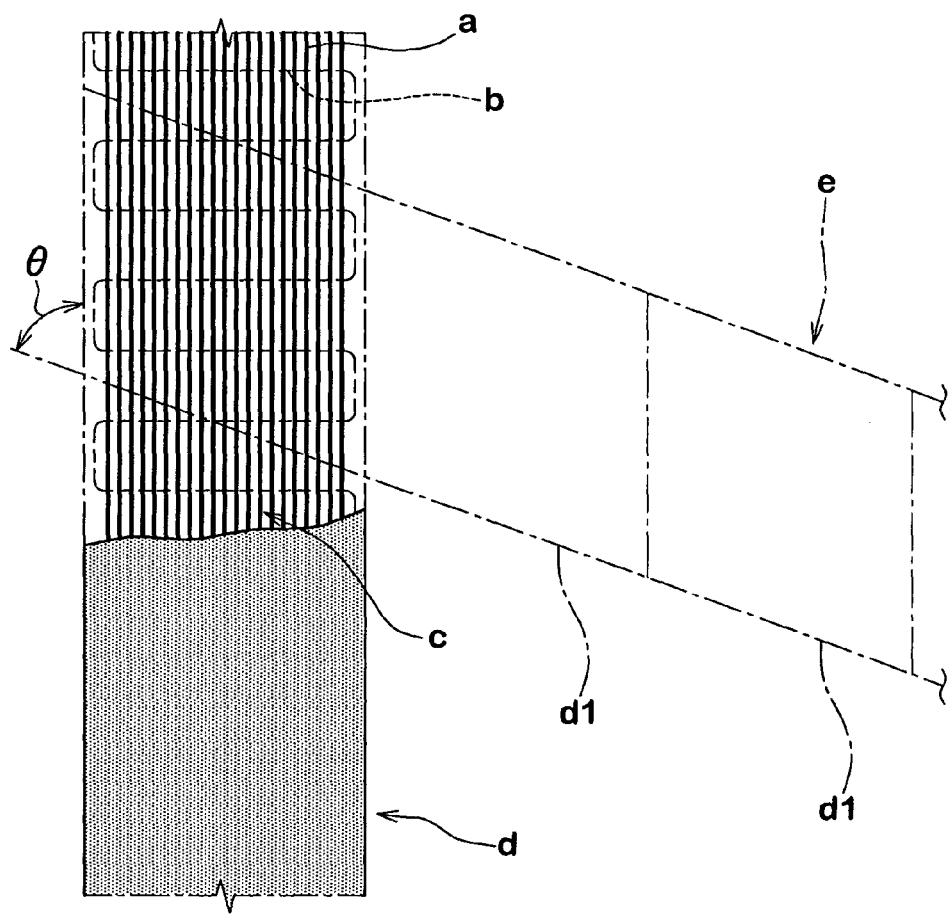
FIG. 8 is a diagram describing formation of the carcass ply.
Figure 9:
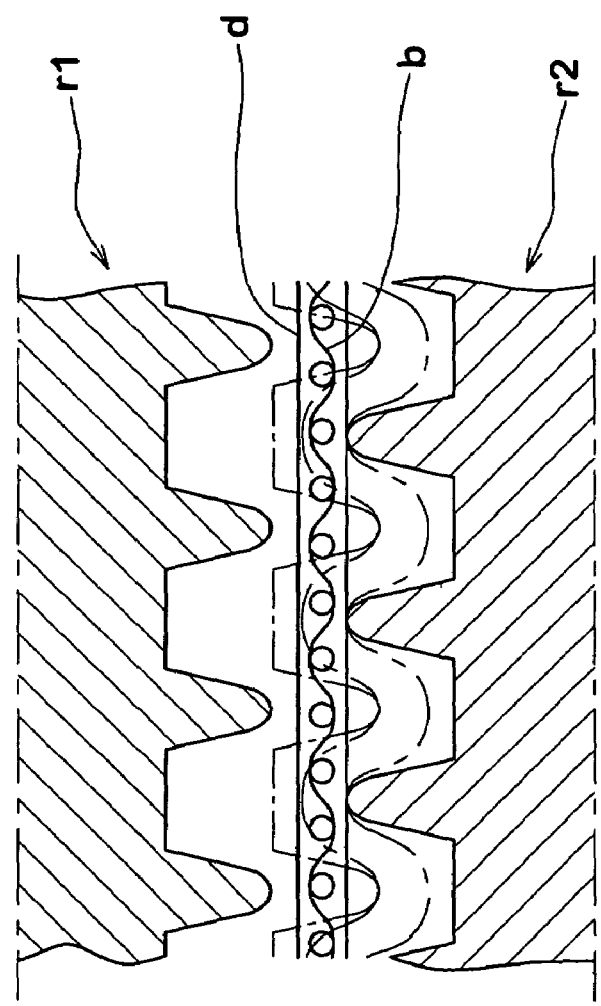
FIG. 9 is a cross sectional view describing the prior art.

The cutting device 20 may be structured such as to include a pair of rollers 21u on an upstream side in the conveying direction of the fabric base substance 16, and a pair of rollers 21d on the downstream side in the conveying direction, as shown in FIGS. 7A and 7B. At this time, it is preferable to displace the phase of the pitch J in the axial direction of the peripheral protrusions 23 of the pair of rollers 21u on the upstream side from the phase of pitch J in the axial direction of the peripheral protrusions 23 of the pair of rollers 21d on the downstream side by one-half pitch (J/2). Accordingly, the weft cut pieces cut by the pair of rollers 21u on the upstream side pass through the pair of rollers 21d on the downstream side so as to be unwoven, thereby easily coming off from the warp 12. As a result, the binding force applied to the warp 12 breaks down, the cord interval at a time of expanding the carcass ply in the troidal shape becomes more uniform, and the uniformity can be further improved. Further, since the pitch of the concave-convex trace at the time of passing through the rollers becomes narrow, it can be also expected that the distinctive effect of undulations on the side surface of the tire is reduced and the outer appearance is improved.

The present description has been provided to describe a preferable embodiment of the present invention. However, the rubber coated fabric can be used for a belt ply, a band ply or the like in addition to the carcass ply. Accordingly, the present invention is not limited to the illustrated embodiment, and thus can be modified according to the intended use.

EXAMPLES

A rubber coated fabric was formed on the basis of the specifications in Table 1, using the manufacturing method of the present invention. Further, the uniformity or the like of the tire cord arrangement at the time of expanding the carcass ply material in a troidal shape was evaluated by visual observation, after which the carcass ply material using the rubber fabric is cylindrically wound around a forming drum.

TABLE 1

|  | Comparative Example 1 | Example 1 | Example 2 | Comparative Example 2 | Comparative Example 2 | Example 3 | Comparative Example 4 | Comparative Example 5 | Example 4 | Comparative Example 6 | Comparative Example 7 | Example 5 | Comparative Example 8 |
|---|---|---|---|---|---|---|---|---|---|---|---|---|---|
| Material of weft | Cotton | Cotton | Cotton | Cotton | Cotton | Cotton | Cotton | Cotton | Cotton | Cotton | Cotton | Cotton | Cotton |
| Cut ductility (%) | 3 | 8 | 15 | 23 | 15 | 15 | 15 | 15 | 15 | 15 | 15 | 15 | 15 |
| First roller |  |  |  |  |  |  |  |  |  |  |  |  |  |
| Groove width W1 (mm) | 4 | 4 | 4 | 4 | 1 | 3 | 6 | 6 | 6 | 6 | 4 | 4 | 4 |
| Protruding width T1/W2 | 35% | 35% | 35% | 35% | 35% | 35% | 35% | 15% | 35% | 50% | 35% | 35% | 35% |
| Insertion depth h2 (mm) | 3 | 3 | 3 | 3 | 3 | 3 | 3 | 3 | 3 | 3 | 1 | 3 | 5 |
| Second roller |  |  |  |  |  |  |  |  |  |  |  |  |  |
| Groove width W2 (mm) | 4 | 4 | 4 | 4 | 1 | 3 | 6 | 6 | 6 | 6 | 4 | 4 | 4 |
| Protruding width T2/W1 | 35% | 35% | 35% | 35% | 35% | 35% | 35% | 15% | 35% | 50% | 35% | 35% | 35% |
| Insertion depth h2 (mm) | 3 | 3 | 3 | 3 | 3 | 3 | 3 | 3 | 3 | 3 | 1 | 3 | 5 |
| Evaluation (cord arrangement) | — | ○ | ○ | x | — | ○ | x | — | ○ | — | — | ○ | x |

*Arrangement pitch P of warp is 1 mm (striking number 50/5 cm).

As can be seen from Table 1, the rubber fabric in Comparative Example 1 is difficult to use in the carcass because the cut ductility of the weft is too low and the weft is broken in the rubber applying step, whereby a tentering of the fabric can not be achieved and a disassembly of the tire cord is generated.

In the rubber fabric of Comparative Example 2, the cut ductility of the weft is too high and the weft is not uniformly cut, so that the uniformity of the tire cord arrangement becomes deteriorated.

In the rubber fabrics of Comparative Examples 3 and 5, the strength of the peripheral protrusion cannot be secured, and the damage of the roller such as the lack of the protrusion is caused.

In the rubber fabric of Comparative Example 4, the groove width W was too wide and, the weft could not be cut in the cut pitch equal to or less than five times the arrangement pitch of the tire cord.

In the rubber fabric of Comparative Examples 6 and 7, the tensile force applied to the weft was short, and the weft could not be cut.

In the rubber fabric of Comparative Example 8, the arrangement pitch itself of the tire cord becomes irregular, and the concave-convex scratch is generated on the surface of the fabric.

Since the present invention is structured in the above manner, it is possible to uniformly cut the weft at the predetermined cut pitch without irradiating the fabric with an electron beam. As a result, it is possible to improve the uniformity of the tire without generating a reduction in the outer appearance performance caused by conveyance of the fabric through the rollers.

What is claimed is:

1. A method of manufacturing a rubber coated fabric for a tire utilizing a woven fabric obtained by weaving a warp constituted by a tire cord and a weft, which comprises coating the tire woven fabric with rubber to form a fabric base substance, cutting the weft of the fabric base substance by a cutting device at a cut pitch $C_P$ of two to five times an arrangement pitch P of the warp, by conveying the fabric base substance within a gap defined by the cutting device, said cutting device comprising a pair of rollers on an upstream side in a passing direction of the fabric base substance and a pair of rollers on a downstream side in the passing direction, wherein a phase of a pitch in an axial direction of the peripheral protrusions of the pair of rollers on the upstream side is displaced from a phase of a pitch in the axial direction of the peripheral protrusions of the pair of rollers on the downstream side by one half pitch each of said pair of rollers including a first roller in which peripheral protrusions and peripheral grooves are alternatively and continuously provided in an axial direction and a second roller in which opposing peripheral protrusions and peripheral grooves are alternately formed in the axial direction, said protrusions and grooves of the first and second rollers being offset so that the protrusions of the first roller engage the grooves of the second roller, and vice versa, whereby groove widths W1 and W2 of the peripheral grooves are set between 2.0 and 5.0 mm, protruding widths T1 and T2 of the peripheral protrusions are set to 0.25 to 0.5 times the groove widths W1 and W2, and insertion depths h1 and h2 of the protrusions to the peripheral grooves are set between 2.0 and 4.0 mm.

2. The method of manufacturing a rubber coated fabric for a tire according to claim 1, wherein
the groove width W1 of the first peripheral groove, the protruding width T1 of the first peripheral protrusion and the insertion depth h1 of the first peripheral protrusion to the second peripheral groove are the same as the groove width W2 of the second peripheral groove, the protruding width T2 of the second peripheral protrusion and the insertion depth h2 of the second peripheral protrusion to the first peripheral groove, respectively.

3. The method of manufacturing a rubber coated fabric for a tire according to claim 1, wherein
the insertion depths h1 and h2 are variable.

4. The method of manufacturing a rubber coated fabric for a tire according to claim 1, wherein
the weft has a cut ductility of between 7 and 15%.

5. The method of manufacturing a rubber coated fabric for a tire according to claim 1, wherein
the weft has a cut ductility of between 9 and 13%.

6. The method of manufacturing a rubber coated fabric for a tire according to claim 1, wherein
the weft has a breaking strength of between 5 and 15 N.

7. The method of manufacturing a rubber coated fabric for a tire according to claim 1, wherein
a radial distance H1 from an outer surface of the first peripheral protrusion to a groove bottom of the second peripheral groove and a radial distance H2 from an outer surface of the second peripheral protrusion to a groove bottom of the first peripheral groove is 1.5 to 3.5 times the thickness K of the fabric base substance.

8. The method of manufacturing a rubber coated fabric for a tire according to claim 1, wherein
the weft has a breaking strength of between 7 and 13 N.

9. The method of manufacturing a rubber coated fabric for a tire, wherein the weft employs a low ductility yarn having a cut ductility of between 5 and 20%.

* * * * *